US007010749B2

(12) United States Patent
Hasha et al.

(10) Patent No.: US 7,010,749 B2
(45) Date of Patent: Mar. 7, 2006

(54) METHOD AND SYSTEM FOR TRACKING SOFTWARE COMPONENTS

(75) Inventors: Richard Hasha, Seattle, WA (US); Harry S. Pyle, Bellevue, WA (US)

(73) Assignee: William H. Gates, III, Medina, WA (US)

( * ) Notice: Subject to any disclaimer, the term of this patent is extended or adjusted under 35 U.S.C. 154(b) by 378 days.

(21) Appl. No.: 10/243,169

(22) Filed: Sep. 13, 2002

(65) Prior Publication Data

US 2003/0020742 A1    Jan. 30, 2003

Related U.S. Application Data

(62) Division of application No. 09/322,964, filed on May 28, 1999.

(60) Provisional application No. 60/118,668, filed on Feb. 3, 1999.

(51) Int. Cl.
*G06F 15/00*    (2006.01)
(52) U.S. Cl. ........................... 715/762; 715/764
(58) Field of Classification Search ........... 715/762, 715/700, 734, 740, 764, 771, 851, 765, 763
See application file for complete search history.

(56) References Cited

U.S. PATENT DOCUMENTS 5,086,385 A  *  2/1992  Launey et al. .............. 700/83
5,410,326 A     4/1995  Goldstein ................... 348/734
5,815,086 A  *  9/1998  Ivie et al. ................ 340/825.52
6,178,362 B1 *  1/2001  Woolard et al. ............ 700/295
2002/0016639 A1* 2/2002  Smith et al. .................... 700/9
2003/0033470 A1* 2/2003  Saito et al. .................. 711/100

FOREIGN PATENT DOCUMENTS

EP          0812091 A2    12/1997
WO       WO 98/59282      12/1998

OTHER PUBLICATIONS

Sony et al.; "The HAVI Specification: Specification of the Home Audio/Video Interoperability (HAVI) Architecture. Version 1.0 Beta," HAVI Organization, Nov. 19, 1998, pp. 1-384.

* cited by examiner

*Primary Examiner*—Cao (Kevin) Nguyen
(74) *Attorney, Agent, or Firm*—Woodcock Washburn LLP

(57) ABSTRACT

A method and system for generating a user interface for controlling software components through a user control point device. The user interface system provides multiple software components that each can provide a user interface component. Each user interface component provides a user interface for the corresponding software component. A user control point component requests each software component to provide its user interface component. The user control point component then displays an indication of each software component. In response to the selection of a software component, the user control point component requests the user interface component for that software component to display its user interface through the control point device. When a user interacts with that user interface, the user interface component notifies the corresponding software component of the interaction.

9 Claims, 17 Drawing Sheets

METHOD AND SYSTEM FOR TRACKING SOFTWARE COMPONENTS

CROSS-REFERENCE TO RELATED APPLICATIONS

This application is a divisional of Ser. No. 09/322,964, filed May 28, 1999, the entirety of which is incorporated herein by reference, and is related to U.S. Patent Application No. 60/118,668, entitled "COMMON DISTRIBUTED OBJECT PLATFORM," filed on Feb. 3, 1999; U.S. patent application Ser. No. 09/322,455, entitled "METHOD AND SYSTEM FOR TRACKING SOFTWARE COMPONENTS," filed on May 28, 1999; U.S. patent application Ser. No. 09/322,962, entitled "METHOD AND SYSTEM FOR TRACKING CLIENTS," filed on May 28, 1999; U.S. patent application Ser. No. 09/322,643, entitled "AUDIO VISUAL ARCHITECTURE," filed on May 28, 1999; U.S. patent application Ser. No. 09/322,459, entitled "METHOD AND SYSTEM FOR CONTROLLING ENVIRONMENTAL CONDITIONS," filed on May 28, 1999; U.S. patent application Ser. No. 09/322,207, entitled "METHOD AND SYSTEM FOR DISTRIBUTING ART," filed on May 28, 1999; U.S. patent application Ser. No. 09/322,965, entitled "METHOD AND SYSTEM FOR IMPLEMENTING VIRTUAL FUNCTIONS OF AN INTERFACE," filed May 28, 1999; U.S. patent application Ser. No. 09/322,852, entitled "METHOD AND SYSTEM FOR MANAGING SOFTWARE COMPONENTS," filed on May 28, 1999; and U.S. patent application Ser. No. 09/322,457, entitled "METHOD AND SYSTEM FOR PROPERTY NOTIFICATION," filed on May 28, 1999, the disclosures of which are incorporated herein by reference.

TECHNICAL FIELD

The present invention relates generally to a computer system for generating user interfaces and, more particularly, to a system that generates a user interface for controlling distributed devices.

BACKGROUND

A large environment, such as a large building, a factory, or a large house, may have hundreds and thousands of devices that control various systems within the environment. These systems may include lighting systems, heating systems, elevators, and various electronic systems (e.g., monitors, cameras, and CD players). In such large environments, the controlling of the devices can be cumbersome. Each device may provide a control panel through which the device can be controlled. For example, a CD player may have a control panel on it for controlling the device to eject the CDs, to pause the CD, and so on. These devices may also provide an electronic interface through which the device can be controlled by a computer. A computer that is connected to the electronic interface may provide a user interface through which a user can control the device. These devices may be connected to a communications channel, such as a serial link, so that a central computer can control the devices. The connections to the communications channel may be direct when the device has an embedded interface to the communications channel or may be indirect by being connected to a computer system that is then connected to the communications channel. To control the devices from a central location, a user interface for each device needs to be developed for the computer at the central location. The development of the user interfaces for controlling these devices from a remote location can be expensive and time-consuming. Moreover, whenever new devices are added to the environment, new user interfaces also need to be developed so that the new devices can be controlled remotely.

In certain environments, such as a large house, it may be desirable to remotely control the devices from various locations rather than at a central location. In addition, it may be desirable to allow control of only certain devices from each location so that the user interface can be customized to the devices that can be controlled. For example, within a media room it may be desirable to control all the devices within that room and to control certain devices (e.g., lights) in adjacent rooms. The use of the same user interface, which is intended for controlling all the devices in an environment from a central location, would be cumbersome if used at multiple locations where it is only desired to control certain devices. For example, it would be cumbersome to have a user interface for controlling all devices within a large building, when only one type of device (e.g., a light switch) should logically be controlled from that location.

SUMMARY

A method and system for generating a user interface for controlling software components through a user control point device is provided. The user interface system provides multiple software components that each can provide a user interface component. Each user interface component provides a user interface for the corresponding software component. A user control point component requests each software component to provide its user interface component. The user control point component then displays an indication of each software component. In response to the selection of a software component, the user control point component requests the user interface component for that software component to display its user interface through the control point device. When a user interacts with that user interface, the user interface component notifies the corresponding software component of the interaction. The user control point component may have an associated space (e.g., room within a house). The user control point component may identify each software component associated with that space and provide a user interface for the software components through their user interface components. In addition, a software component may provide a user interface component to more than one user control point component. In this way, multiple users can be controlling the software component simultaneously through different user control point devices. In one embodiment, the user interface component that is provided by a software component is customized to a combination of the user control point device and the particular software component that is requesting the user interface component.

DETAILED DESCRIPTION

Figure 1:
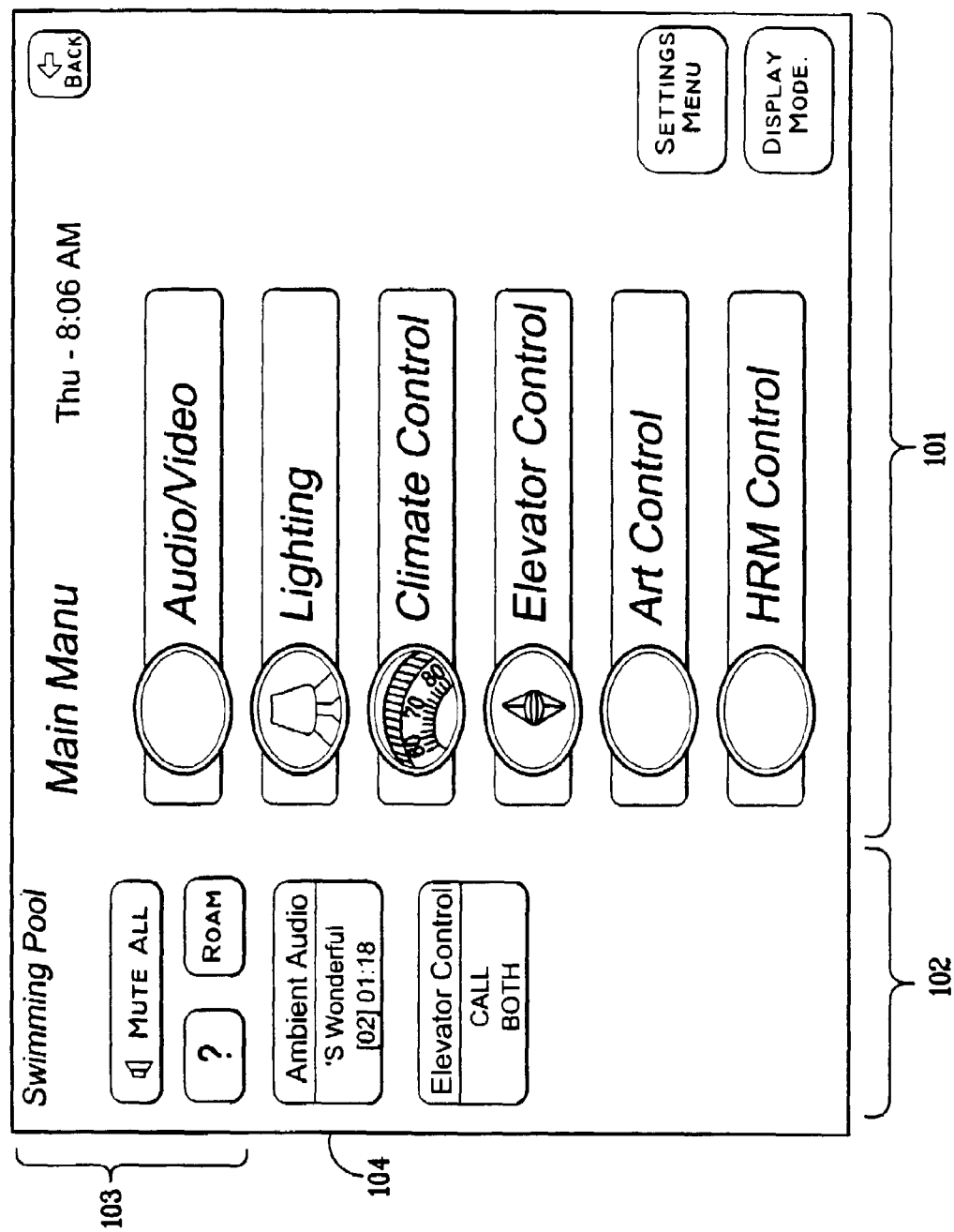
FIG. 1 illustrates the main display of the user control point device.

A method and system for generating a user interface for controlling components through a user control point device, such as a touch panel display, is provided. The term "component" refers to any hardware or software entity that can be controlled. A hardware component may be a device such as a CD player, and a software component may be a computer routine, object, thread, process, and so on. A software component may serve to control a hardware component. For example, a software component may serve as a programmatic interface to a CD player. In one embodiment, the user interface system identifies the software components that can be controlled through a user control point ("UCP") device. For example, if a UCP device is located within a certain room in a house, then the user interface system may allow the UCP device to only control those software components that, in turn, control those hardware components related to that room or adjacent rooms. The user interface system provides a UCP component, which is also a software component, for each UCP device. The UCP component controls the overall user interface of the UCP device and may identify the software components that are accessible from the UCP device. Each software component may have one or more corresponding user interface components, which are also software components, or may have no user interface component. A user interface component provides a user interface for a UCP device and controls the corresponding software component. A software component may receive commands from its user interface component and perform the commands itself or forward those commands to a hardware component that it may control. Each software component may provide a user interface component when requested by a UCP component or other software component. The UCP component can use the user interface components to generate a user interface for the software components that it controls. These user interface components can be tailored to the specific software component and the UCP device.

The user interface system may allow a single software component to be controlled simultaneously from multiple UCP devices. For example, the volume of background music, or ambient audio, that is played throughout an environment may be controllable by each UCP device within that environment. The user interface system allows the user interface at several UCP devices to reflect the current state of the corresponding software component, which may in turn reflect the state of a hardware component. For example, when a certain volume level for the ambient audio is selected at one UCP device, the user interfaces of the other UCP devices are updated to reflect the current volume level. The user interface system uses a property notification mechanism to ensure that each user interface component is aware of the current state of its corresponding software component.

The user interface system also allows user interfaces to be defined for subcomponents of a software component. For example, a software component corresponding to an entertainment center may have subcomponents corresponding to a television, CD player, and sound system within the entertainment center. Each subcomponent may provide a corresponding user interface component, which can be aggregated into the user interface for the software component corresponding to the entertainment center. Thus, the user interfaces provided at a UCP device and the corresponding user interface components are effectively nested. Also, since user interface components and UCP components are both software components, they may themselves provide user interface components where appropriate.

FIGS. 1–6 illustrate sample user interfaces of a touch panel UCP device. FIG. 1 illustrates the main display of the user control point ("UCP") device. The display indicates that the UCP device is currently configured to control components associated with the swimming pool area within a house. The areas within an environment are referred to as spaces. For example, the swimming pool area and the living room within a house are each considered a space. The display 100 includes a main portion 101, a bulletin portion 102, and a title portion 103. The main portion of the display contains a menu item implemented as a button for various components associated with the current space. In this example, the components relate to audio/video, lighting, climate control, elevator control, art control, and high-resolution monitor control, which each has a corresponding button on the main portion. When a user selects one of the buttons, the user interface for the corresponding software component is provided by a user interface component for that software component. The bulletin portion contains various status buttons that can be selected to directly interact with a certain component or subcomponent. In this example, the ambient audio bulletin button 104 indicates that a certain song is currently being played as ambient audio. When a user selects the ambient audio bulletin button, the user interface for controlling ambient audio as provided by the user interface component for the corresponding software component is displayed. The title portion indicates that the UCP device is displaying information for the swimming pool space and that the main portion contains the main menu for the UCP. The title portion also contains a roam button that allows a user to specify that this UCP device is to display the user interface for controlling another space.

Figure 2:
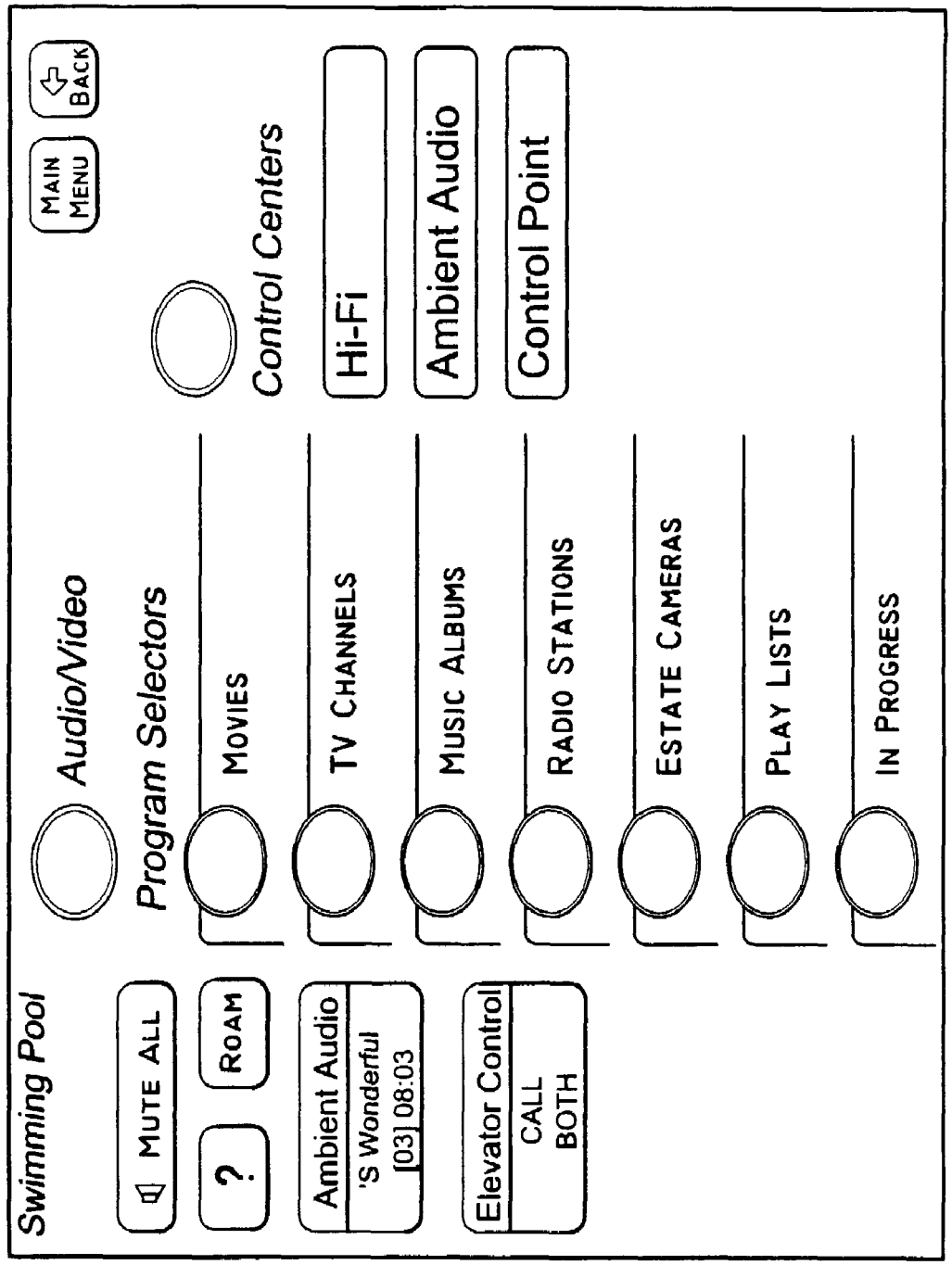
FIG. 2 illustrates a display of the user control point device after the audio/video button has been selected.

FIG. 2 illustrates a display of the UCP device after the audio/video button has been selected. The main portion has been changed to reflect options relating to controlling audio/video. The user interface for controlling audio/video is provided by the user interface component for the audio/video software component. The main portion contains various program selector buttons for controlling various programs. An audio/video program may be a movie, a television channel, a music album, and so on. The main portion also contains various control center buttons for controlling various control center components within the current space. A control center software component may correspond to an entertainment center, an ambient audio hardware component, or other hardware component within the space.

Figure 3:
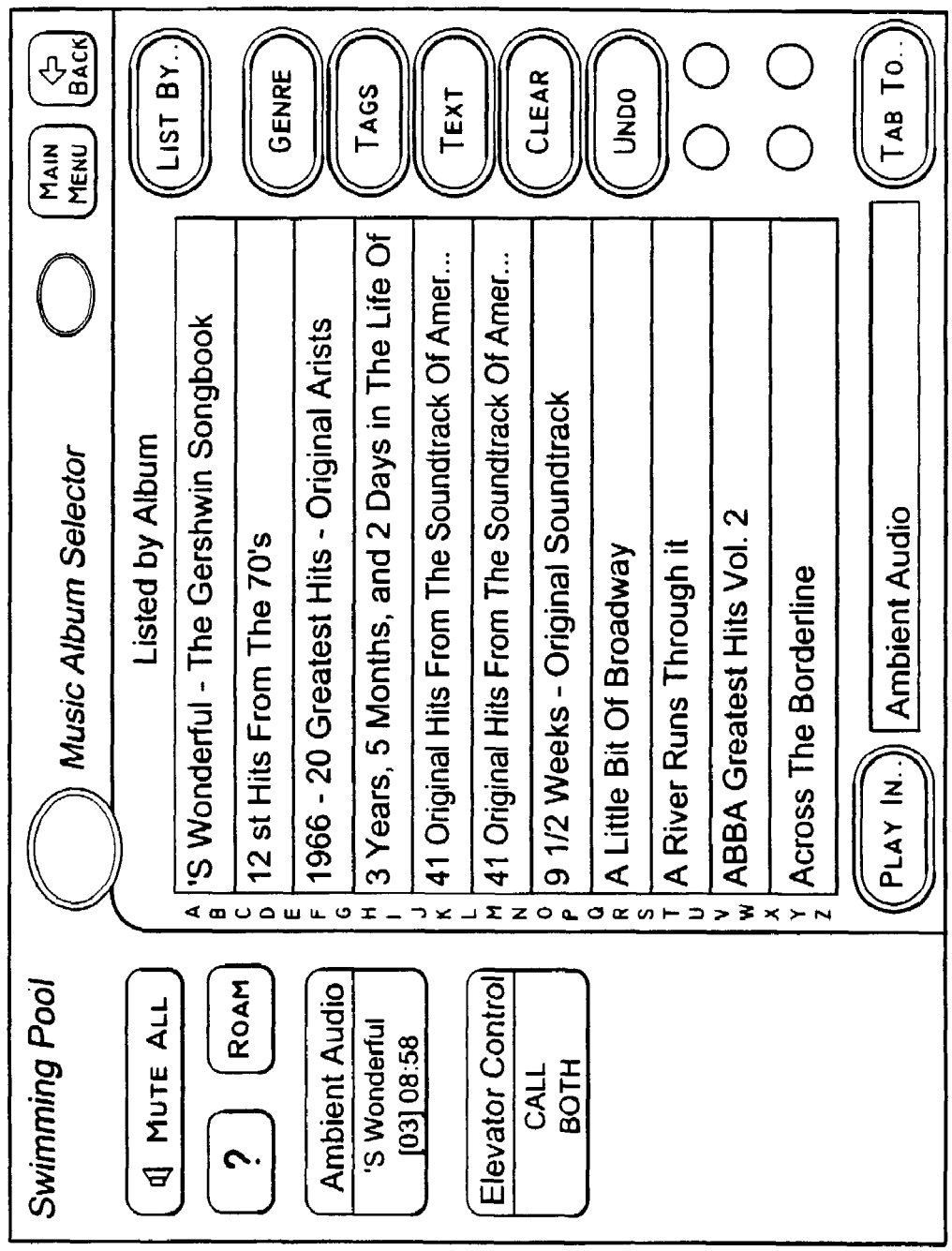
FIG. 3 illustrates a display of the user control point device after the music album selector button has been selected.

FIG. 3 illustrates a display of the UCP device after the music album selector button has been selected. The main portion has been changed to reflect the list of available music albums. The user interface component for the audio/visual software component controls the display of this user interface. The various controls of the main portion allow the user to select an available album and to direct the music to a hardware component, such as the ambient audio component.

Figure 4:
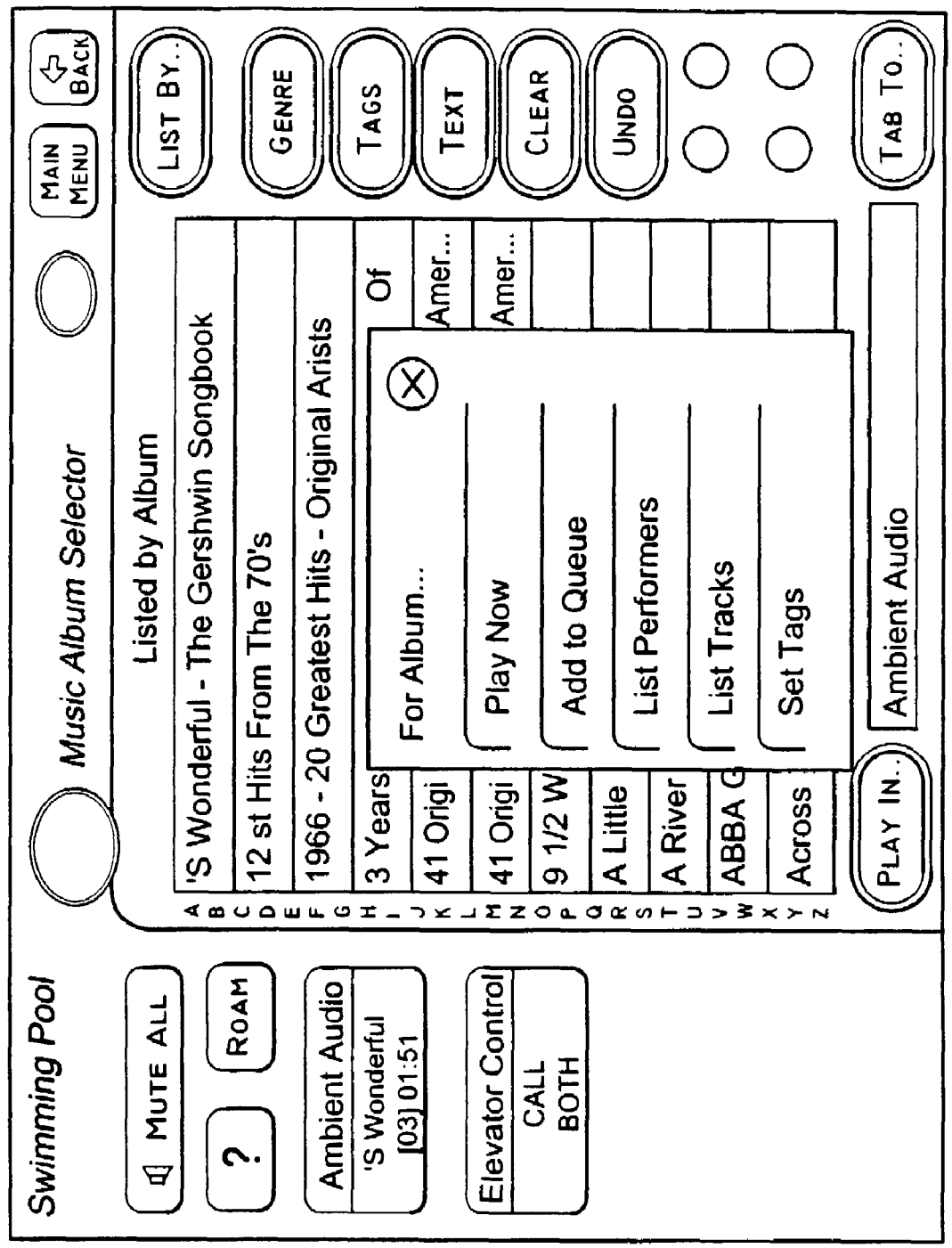
FIG. 4 illustrates a display of a user control point device after a user has selected a particular music album.

FIG. 4 illustrates a display of a UCP device after a user has selected a particular music album. In this example, the user interface displays a list of options available for that album in a pop-up window. If the user selects to play the album now, then the album output is directed to the ambient audio hardware component.

Figure 5:
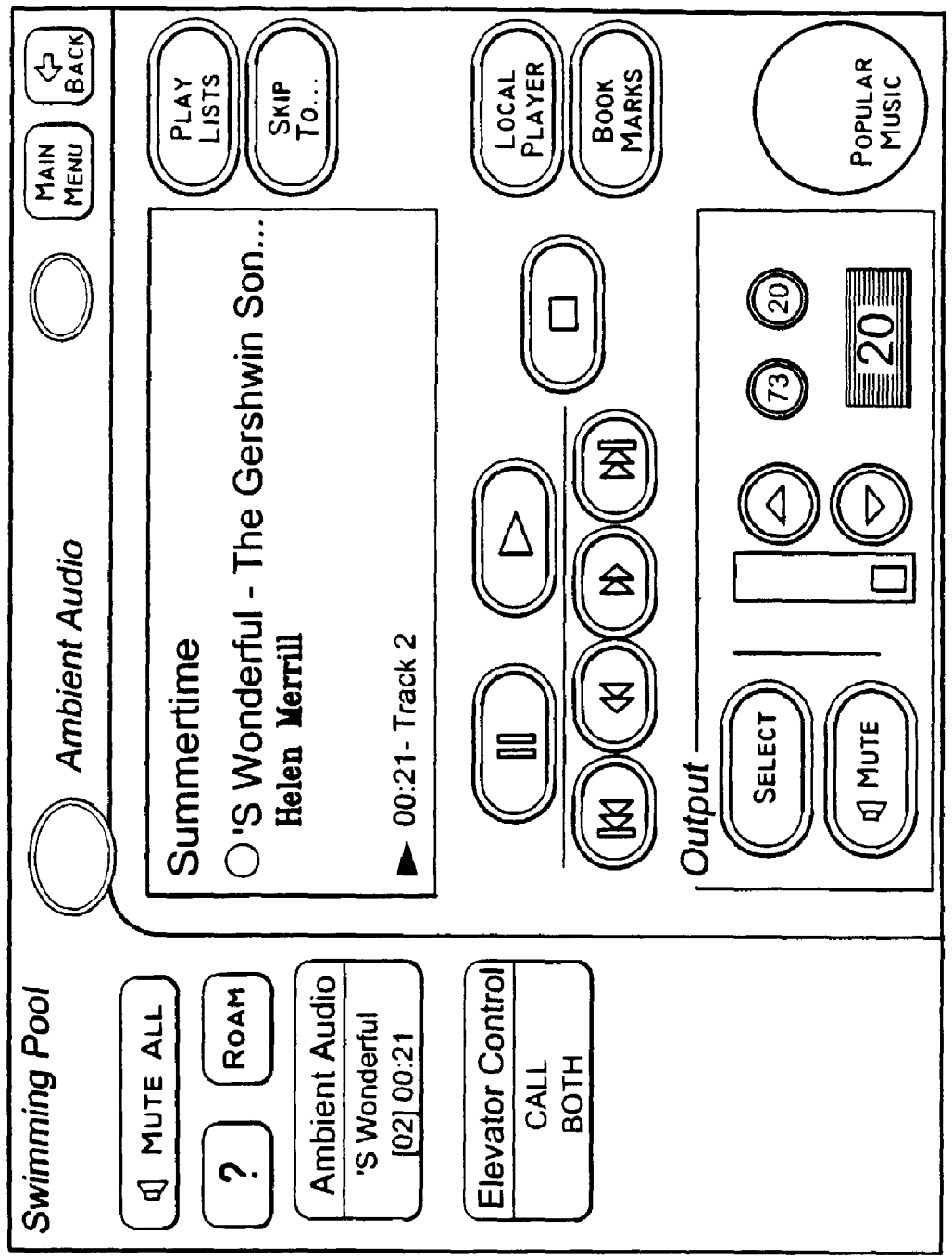
FIG. 5 illustrates a display of a user control point device after a particular album has been selected to play in the ambient audio component.

FIG. 5 illustrates a display of a UCP device after the ambient audio has been selected. The ambient audio can be selected either from the main portion of FIG. 2, from the bulletin portion of any of the figures, or from the Play Now button of FIG. 4. The main portion contains a user interface for controlling the ambient audio. In this example, the main portion indicates that a certain music album is currently being directed to the ambient audio hardware components. The displayed user interface allows the user to adjust the characteristics of the ambient audio such as increasing the volume, pausing, selecting another track, and so on.

Figure 6:
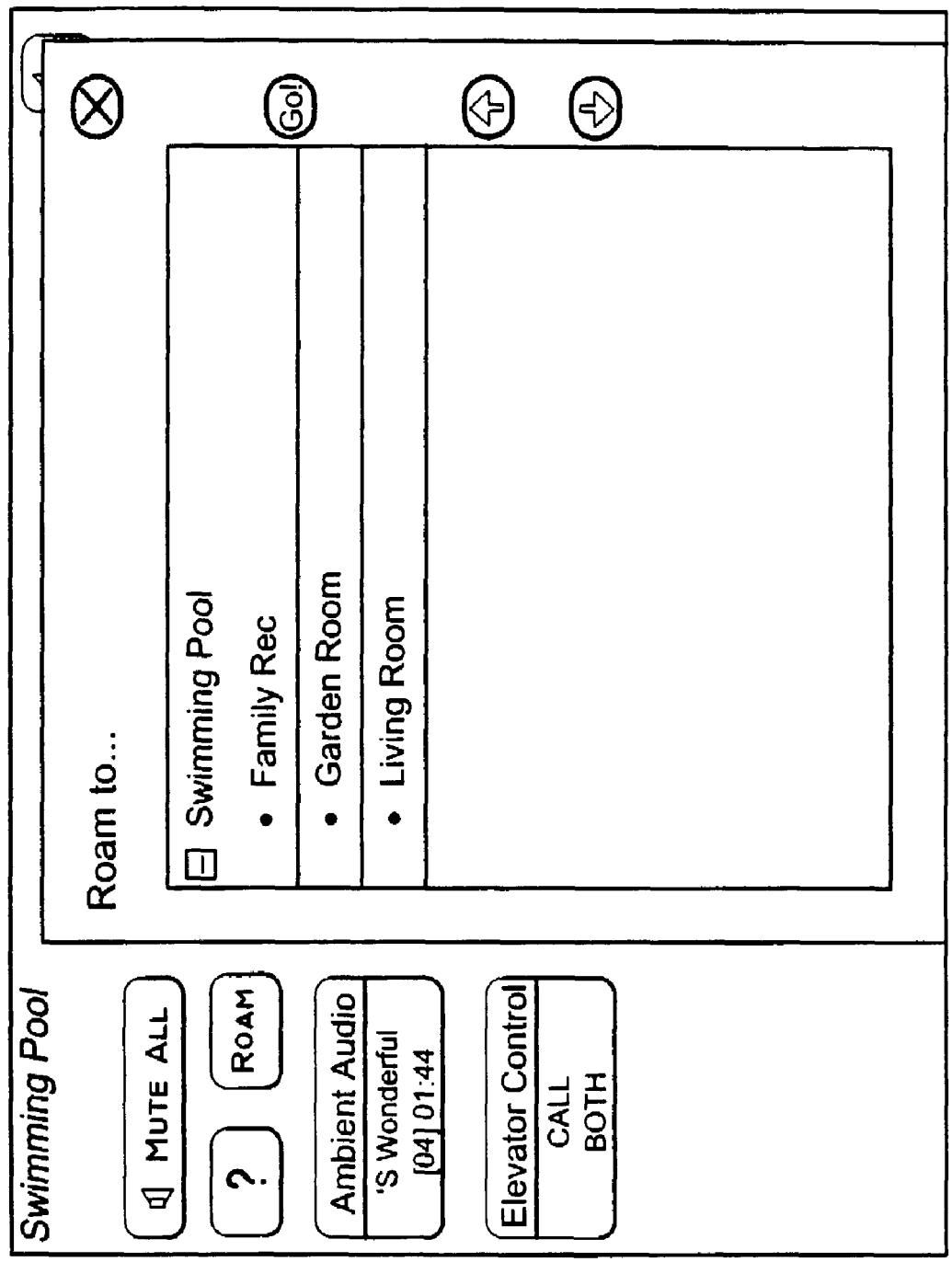
FIG. 6 illustrates a display of a user control point device when a user has selected to roam to another space.

FIG. 6 illustrates a display of a UCP device when a user has selected to roam. The user selected the roam button of the bulletin portion to display this user interface. In response, a pop-up window is displayed that lists the various spaces that can be controlled from this UCP device. If the user selects the garden room, then the UCP component will identify the components associated with the garden room and display the appropriate user interface.

Figure 7:
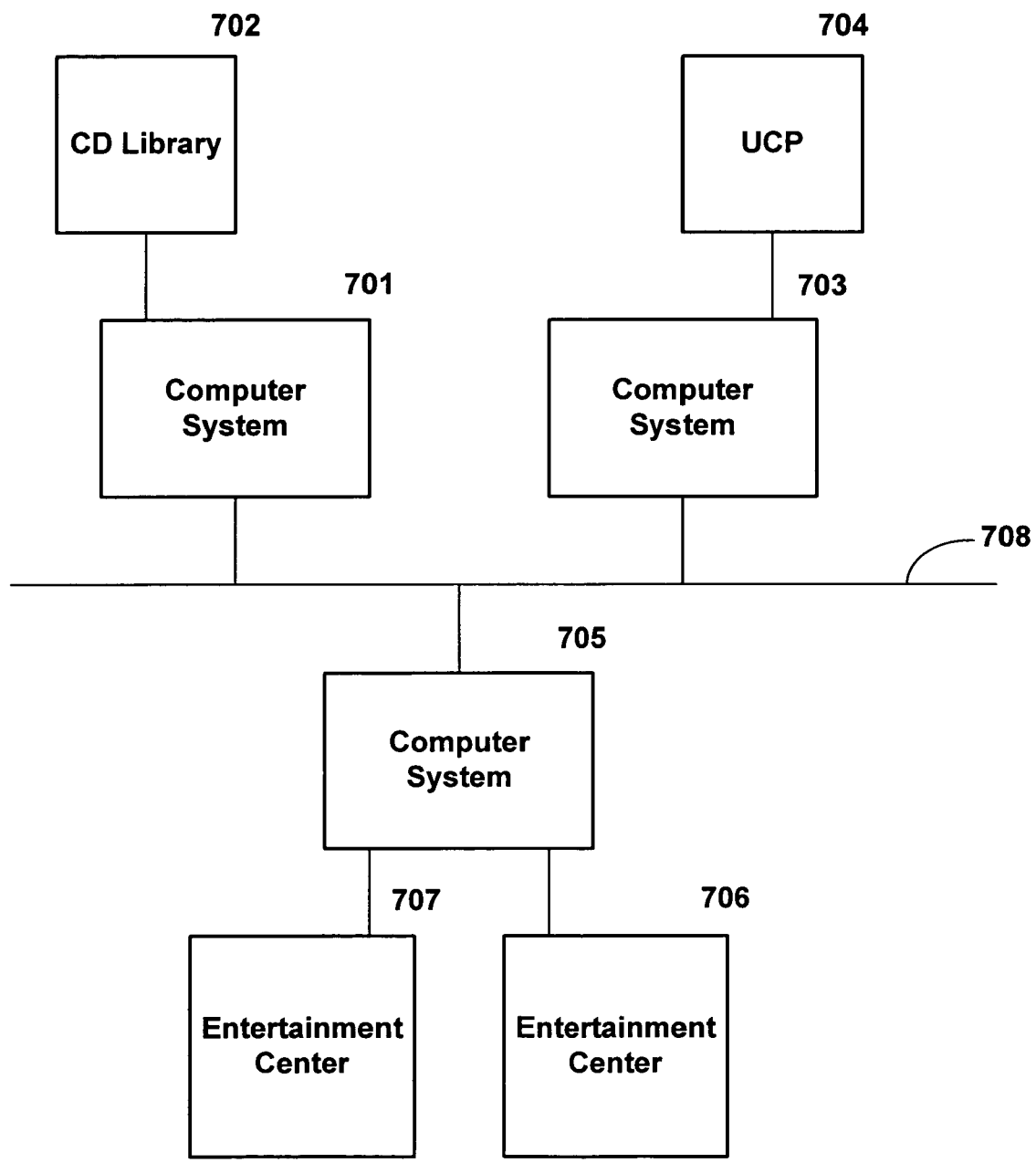
FIG. 7 is a block diagram illustrating the architecture of computer systems and the associated components in one embodiment.

FIG. 7 is a block diagram illustrating an architecture of computer systems and associated hardware components in one embodiment. The computer systems 701, 703, 705 are interconnected via a communications channel 708. Each computer system may be connected to one or more hardware components, such as a CD library 702, a UCP device 704, and entertainment centers 706–707. These computer systems may be stand-alone computers with interfaces to the component or may be computer systems that are integrated within the component. The communications between these computer systems may be based on technology described in the U.S. patent application "Method and System for Tracking Software Components." A "tracking reference" is a reference that identifies a software component and can be used to request that the availability of a software component be tracked. A software component that requests that another software component be tracked may be notified when the tracked software component becomes available and unavailable. When a software component becomes available, a "behavioral reference" can be retrieved and used to access the behavior of the software component so long as the software component stays available. For example, a tracking reference may be the name of a software component, and a behavioral reference may be a pointer to a software component. The computer systems may include a central processing unit, memory, and input/output devices. The software components of the user interface system may be implemented as computer programs that execute on these computer systems. The computer programs and associated data structures may be stored on computer-readable medium, such as memory, disk, and CD-ROM, or transmitted through a computer-readable transmission medium, such as the Internet.

Figure 8:
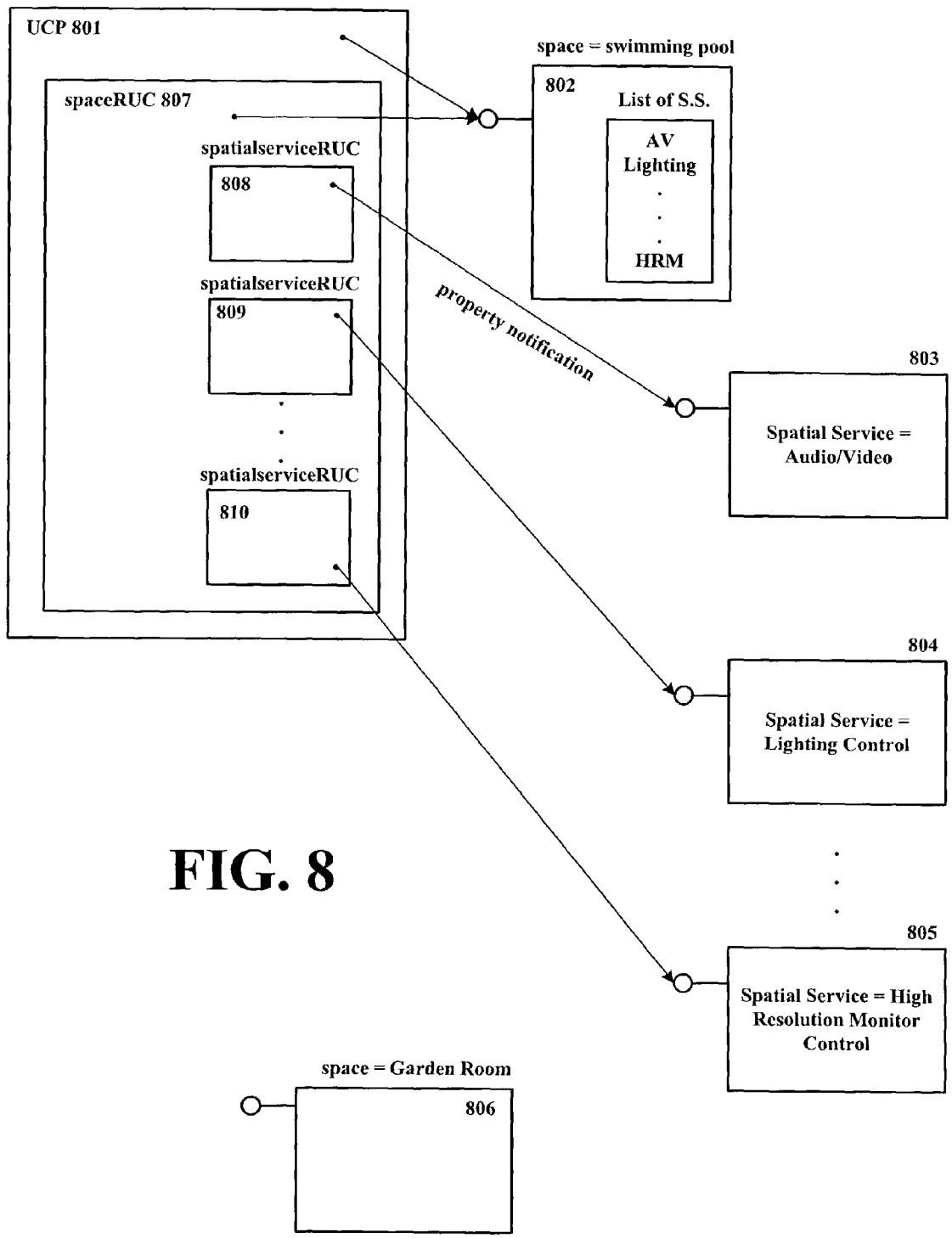
FIG. 8 is a block diagram of modules of the user interface system in one embodiment.

FIG. 8 is a block diagram of software components of the user interface system in one embodiment. In this embodiment, the software components correspond to objects in the object-oriented sense and are sometimes referred to as "resources". The software components of the user interface system include a UCP object 801, space objects 802 and 806, and spatial service objects 803–805. The UCP object includes a space resource user control ("RUC") object 807 and spatial service RUC objects 808–810. The UCP object points to the space object that includes a list of the spatial services (e.g., software components) within the space that can be currently controlled by the user. In this example, the UCP object is associated with the swimming pool space and may display a user interface similar to that as shown in FIGS. 1–6. A spatial service is a behavior associated with a space. The behavior may be the controlling of a hardware component (e.g., CD player) or may be an aggregation of other spatial services (e.g., audio/visual software component). A software component as described above provides a spatial service. In this example, the audio/video, lighting, and high-resolution monitor control spatial services are logically nested within the swimming pool space.

The user interface system instantiates a UCP object for each UCP device. The UCP object may identify its corresponding space from configuration information and establish a tracking reference to the space object for the corresponding space. The identity of the corresponding space can be obtained from any number of places including, but not limited to, a registry system whose information can be either manually entered or automatically established from user preferences. Each space object and spatial services object can provide an RUC object (that is, a type of user interface component) for controlling a user interface associated with the particular space or spatial service object.

In one embodiment, the space and spatial service objects provide the identifier of their corresponding RUC objects when requested or may provide the actual RUC objects themselves. In another embodiment, the identifier of a corresponding RUC object may be obtained from an external source such as configuration information for the space or spatial service object. The RUC objects may be customized to the particular UCP device and the particular user interface component in which they are nested. The combination of the UCP device type (e.g., touch panel display) and embedding object type (e.g., space) defines an environment in which the RUC object is to operate. Thus, when a space or spatial service object is requested to provide the identifier of their RUC object, it is passed the operating environment. Also, if the RUC identification is obtained from configuration information, it may be based on the operating environment. For example, the RUC object may be different depending on whether the UCP device is a touch panel device or a television remote control-type device.

Each RUC object is provided with a tracking reference to its corresponding space or spatial service object. The RUC object for a spatial service object registers to receive notifications of changes in state from its corresponding spatial service object. The RUC objects send commands to their spatial service objects to perform a behavior as requested by a user through the user interface.

Figure 9:
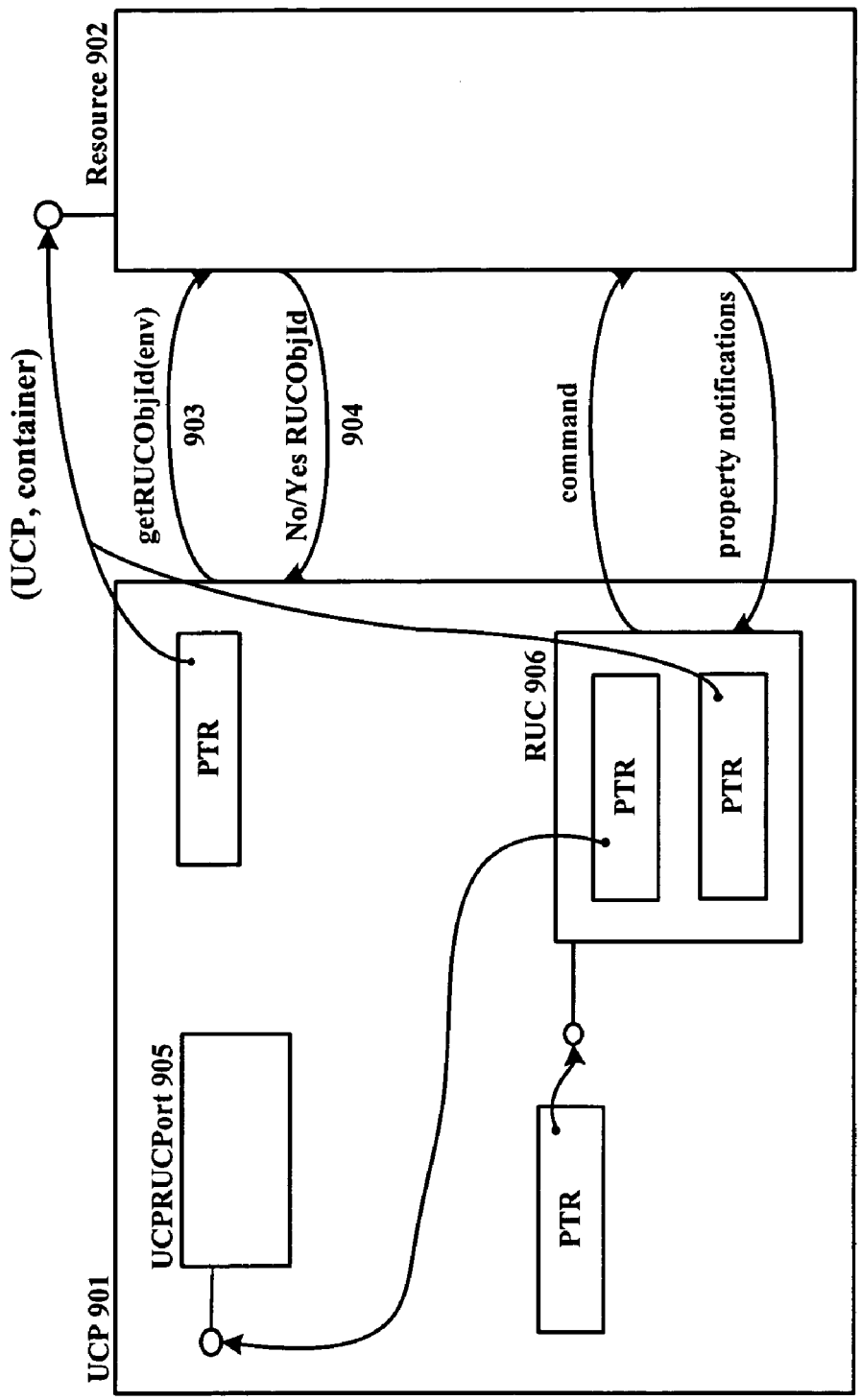
FIG. 9 is a block diagram illustrating certain modules of the user interface system.

FIG. 9 is a block diagram illustrating the nesting of software components in the user interface system. In this example, the embedding object 901 is associated with a resource object 902. After the embedding object is instantiated, it requests the resource object 903 to provide the identifier of an RUC object that is appropriate for the type of UCP device and the type of embedding object of the RUC object. The identifier is returned by the resource object 904. Once the embedding object receives the RUC object identifier, it instantiates an RUC port 905. The RUC port provides a mechanism through which an RUC object can interact with its embedding object. The embedding object then instantiates the RUC object 906. The RUC object is provided with a pointer to the RUC port of its embedding object along with a pointer to the resource object. The RUC object can then interact with its embedding object via the RUC port to display its user interface.

As the user interacts with the user interface, input events are sent to the RUC object. The RUC object can then notify the resource object to perform a certain command to effect the desired behavior. For example, if the resource object corresponds to a video player, then the command may be to fast forward. The RUC object can also request the resource object to notify it of changes in the state of the object. For example, if a user presses the stop button on the video player itself, then a stop notification is sent to the RUC object from the resource object. The RUC object can then adjust its user interface to reflect the change in state of the resource object.

Since each RUC object has a tracking reference to its corresponding space or spatial service object, the RUC object can be notified when these objects become unavailable. The RUC object can then decide to either display the fact that its corresponding resource is not available and wait for notification that it is available, or the RUC object can destroy itself, causing it to disappear from its embedding object.

Figure 10:
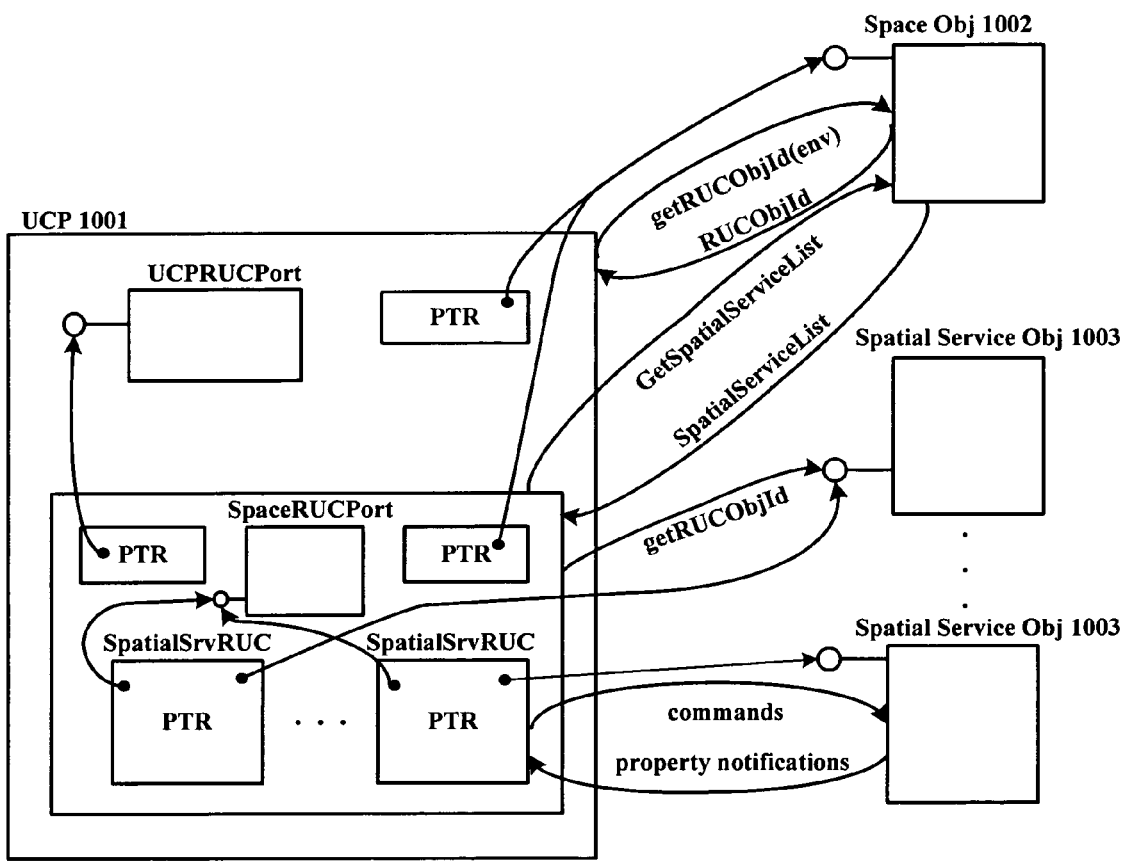
FIG. 10 is a block diagram illustrating more detailed modules of the user interface system.

FIG. 10 is a block diagram illustrating more detailed software components of the user interface system. These components include a UCP object 1001, a space object 1002, and spatial service objects 1003. When a UCP object is instantiated, it may identify the space with which it is associated from configuration information and retrieves a tracking reference to the space object corresponding to that space. When the UCP object is notified that the space object is available, it then requests the space object to provide the identifier of an RUC object for that space. When the UCP object receives the identifier, it instantiates an RUC object for that space. The RUC object is passed a pointer to an RUC port of the UCP object and a pointer to the space object. The space RUC object requests the space object to identify the spatial services that it provides. The space RUC object then retrieves a tracking reference to the spatial service objects. As the space RUC object is notified that each referenced spatial service object is available, it then retrieves a behavioral reference to the spatial service object and requests the spatial service object to provide the identifier of its RUC. The space RUC object then instantiates the RUC objects for the spatial service objects. These spatial service RUC objects are passed a pointer to an assigned space RUC port of the one or more space RUC ports represented by the illustrated space RUC port object within the space RUC object and a pointer to their corresponding spatial service objects. The spatial service object RUC objects interact with the space RUC object, via their space RUC ports, to display their user interface. When the RUC objects receive events, they pass the event as a command to the corresponding spatial service objects to perform the behavior corresponding to the event. For example, if the RUC object for a video player receives an event indicating that the user wants to fast forward, then it sends a fast forward command to the spatial service object for the video player. The spatial service object RUC objects also receive notifications of change in state from the spatial service objects.

FIGS. 11–19 are flow diagrams illustrating the processing of the components of the user interface system in one embodiment. These flow diagrams illustrate the processing performed by the various functions of the objects of the user interface system.

Figure 11:
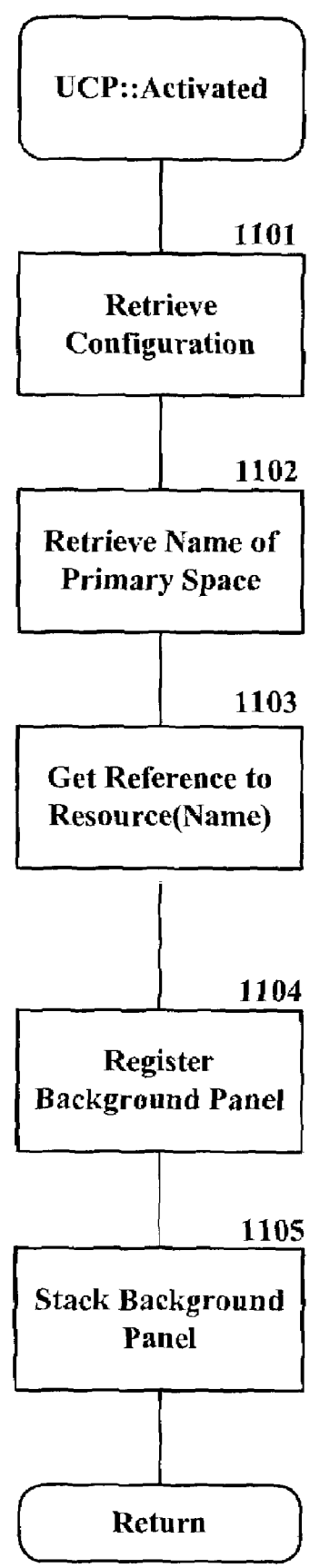
FIG. 11 is a flow diagram of a user control point activated function.

FIG. 11 is a flow diagram of a UCP activated function. This function is invoked when the UCP object is instantiated. The UCP object may be instantiated as part of the initialization of a system for controlling devices. In step 1101, the function retrieves the configuration information for the UCP object. The configuration information includes the identification of the primary space for this UCP object and of the spaces to which it can roam. In step 1102, the function retrieves the name of the primary space. In step 1103, the function gets a tracking reference to the space object corresponding to the primary space. In step 1104, the function creates a background window for the UCP device. This may be a window within the Microsoft Windows operating system that has functions for processing window events. This window is registered with the UCP environment, which uses it as the parent window for all subsequent windows within the user interface, and the function then returns. The UCP environment provides the facility for creating all other windows within the UCP, tracking user activity, caching bitmap images used within the user interface, and identifying the current user of the user control point.

Figure 12:
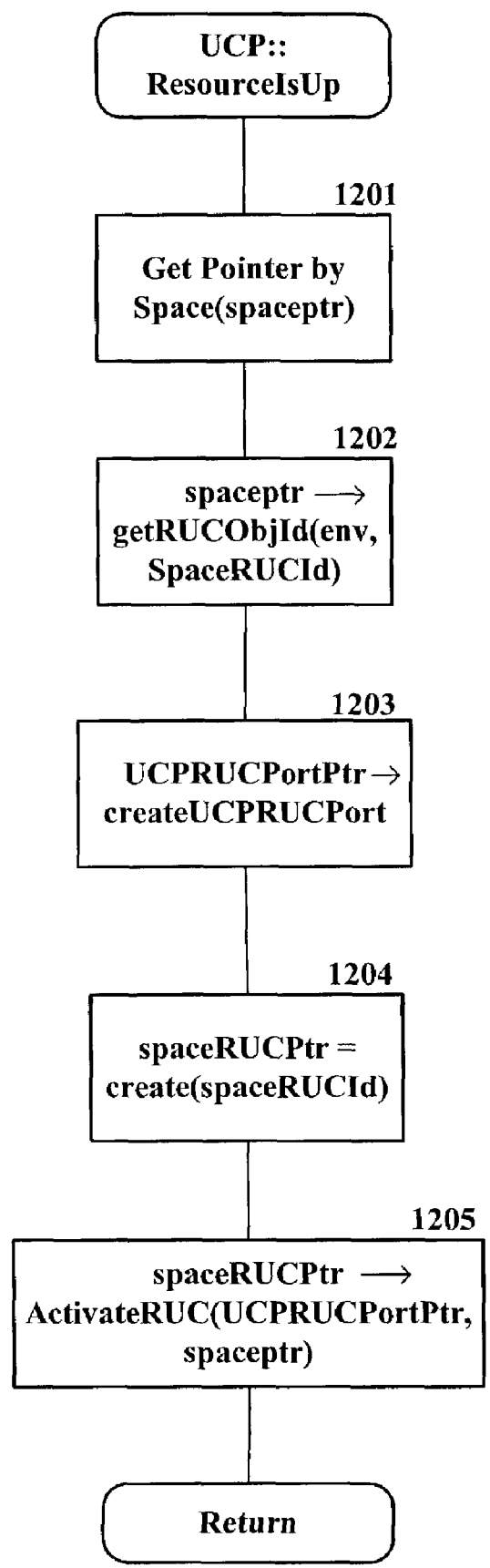
FIG. 12 is a flow diagram illustrating processing performed when the user control point receives an indication that its corresponding space object is up.

FIG. 12 is a flow diagram illustrating processing performed when the UCP object receives an indication that its corresponding space object is up. The tracking of object references is more fully described in the "Method and System for Tracking References to Objects." In step 1201, the function retrieves a pointer (a behavioral reference) to the space object. In step 1202, the function invokes a function of the space object to retrieve the identifier of the RUC object for the space object. The function passes the environment parameter, which indicates the type of UCP device and the type of RUC object container, here being that of a UCP, to the invoked function. In step 1203, the function creates an RUC port for the UCP object. In step 1204, the function creates an RUC object for the space based on the returned identifier. In step 1205, the function invokes a function to activate the RUC object for the space object passing a pointer to the UCP RUC port and a pointer to the space object. The function then returns.

Figure 13:
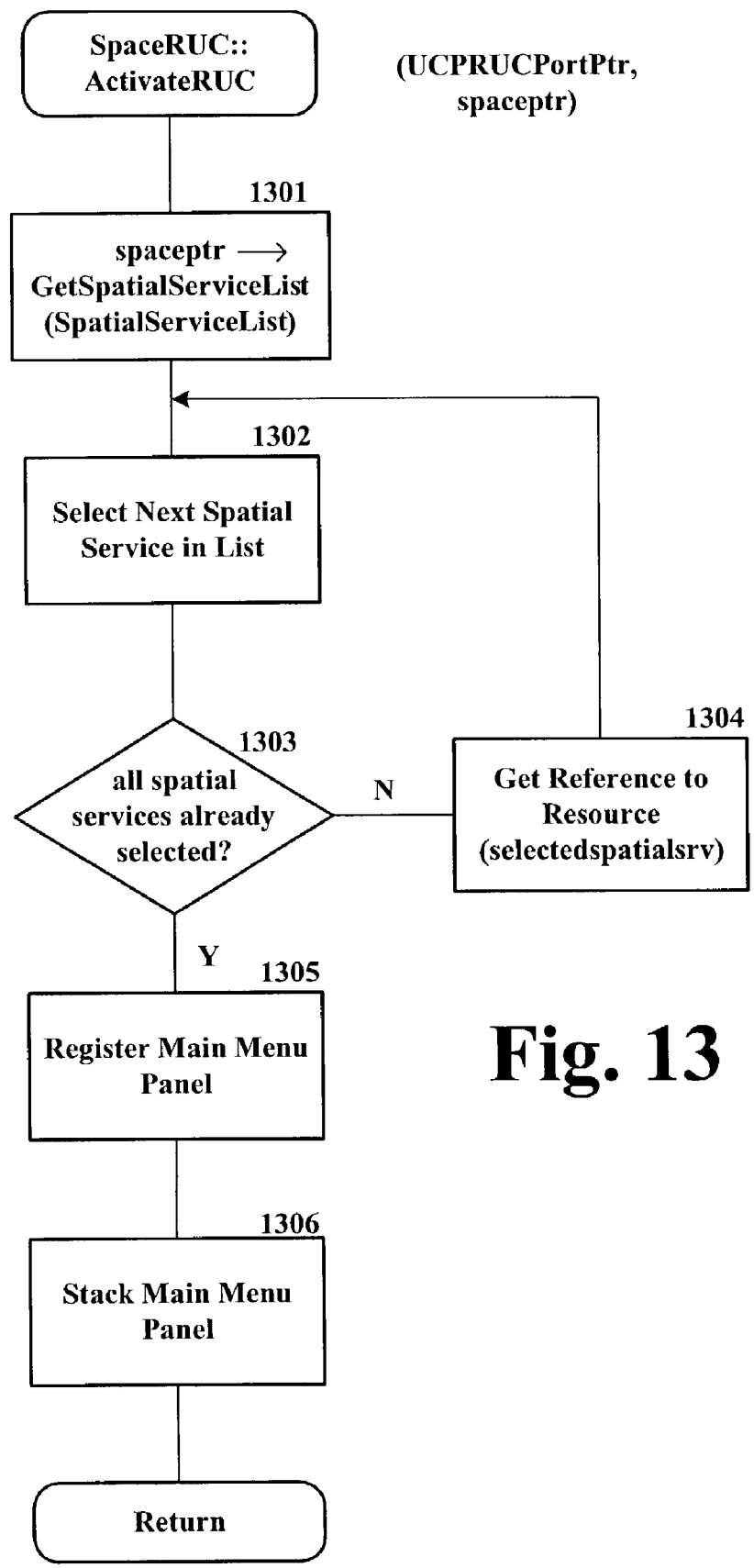
FIG. 13 is a flow diagram illustrating processing performed when the resource user control object for the space object is activated.

FIG. 13 is a flow diagram illustrating processing performed when the RUC object for the space object is activated. This function is passed a pointer to an RUC port for the UCP object and a pointer to the space object. In step 1301, the function retrieves the list of spatial services from the space object. In steps 1302–1304, the function loops selecting each spatial service and retrieving a tracking reference to each spatial service object. In step 1302, the function retrieves the next spatial service in the list. In step 1303, if all the spatial services have already been selected, then the function continues at step 1305, else the function continues at step 1304. In step 1304, the function gets a tracking reference to the selected spatial service object and loops to step 1302 to select the next spatial service. In step 1305, the function registers a main menu panel. A panel is an object that may correspond to a window within the Microsoft Windows operating system and that has functions for processing window events. These windows are created using the UCP environment facility described for FIG. 11. In step 1306, the function stacks the main menu panel so that it is displayed and then the function returns. The RUC object for the space object maintains a list of all panels that have been registered with it by associated spatial service object RUC objects. It also maintains of stack of panels that have been displayed. The top panel in the stack corresponds to the panel currently being displayed. The "stacking" of a panel pushes it into the stack, and the "hiding" of a panel pops it from the stack. The maintenance of the stack by each RUC object for the space object facilitates the implementation of a technique to back up to a previously displayed window.

Figure 14:
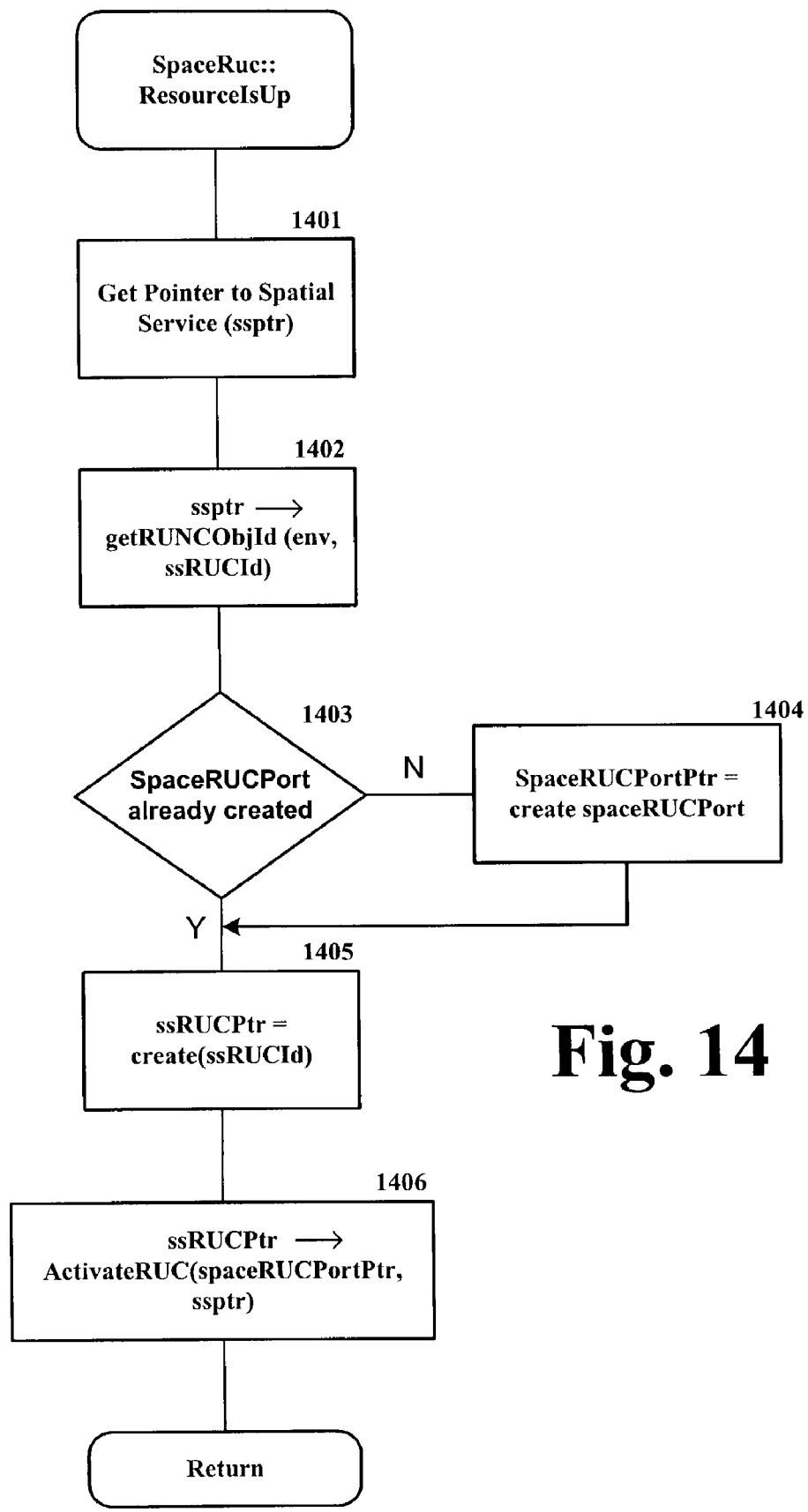
FIG. 14 is a flow diagram illustrating processing performed when a resource user control object for a space object receives an indication that a spatial service object is up.

FIG. 14 is a flow diagram illustrating processing performed when an RUC object for a space object receives an indication that a spatial service object is up. In step 1401, the function gets a pointer to the spatial service object that has been reported as being up. In step 1402, the function retrieves the identifier of the RUC object for the spatial service object. The function passes the environment parameter, which indicates the type of UCP device and the type of RUC object container, here being that of a space, to the invoked function. In step 1404, the function creates an RUC port for the space object. In step 1405, the function creates an RUC object based on the returned identifier. In step 1406, the function activates the RUC object passing a pointer to the RUC port of the space object and a pointer to the spatial service object and then returns.

Figures 15, 16:
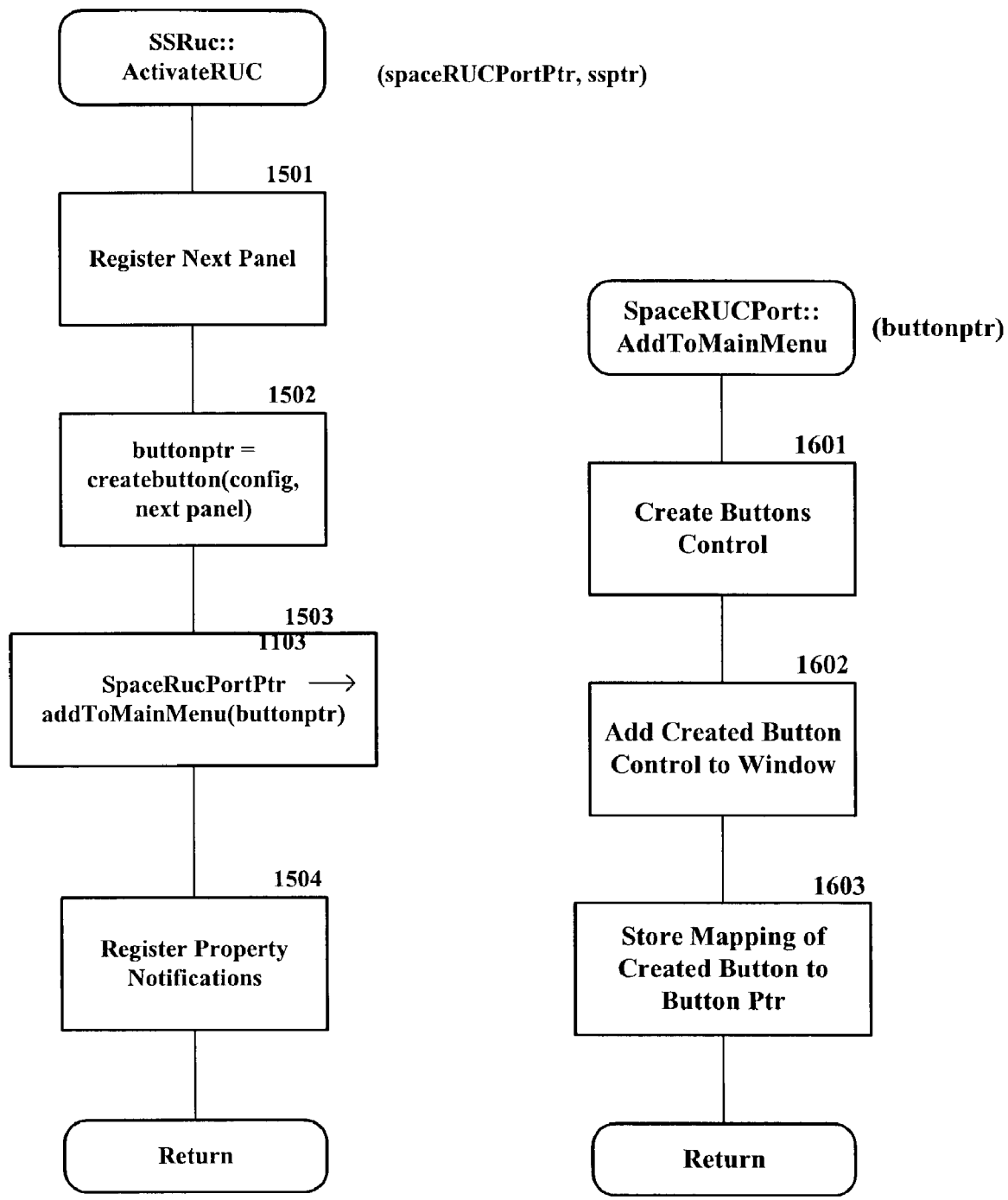
FIG. 15 is a flow diagram illustrating processing performed when a resource user control object for spatial service object is activated.
FIG. 16 is a flow diagram illustrating processing performed when menu item is added to the main menu.

FIG. 15 is a flow diagram illustrating processing performed when an RUC object for a spatial service object is activated. In step 1501, the function registers its panel. In step 1502, the function creates a button object that describes a menu item that is to be displayed on the main menu for the space object. The button object includes information describing the menu item and an indication of the panel that is to be stacked or other operation to be performed when the menu item is selected. In step 1503, the function adds the menu item to the main menu by invoking a function of the RUC port for the space, passing the button object as a parameter. In step 1504, the function registers with the spatial service object to receive notifications of changes in its state. The function then returns.

FIG. 16 is a flow diagram illustrating processing performed when a menu item is added to the main menu. This function is provided as part of the RUC port for the space object. In step 1601, the function creates a button control for the menu item. In step 1602, the function adds the created button control to the window. In step 1603, the function stores a mapping of the created button control to the passed pointer so that when the button control is selected, that event can be passed in the corresponding button object. The function then returns.

Figures 17, 18:
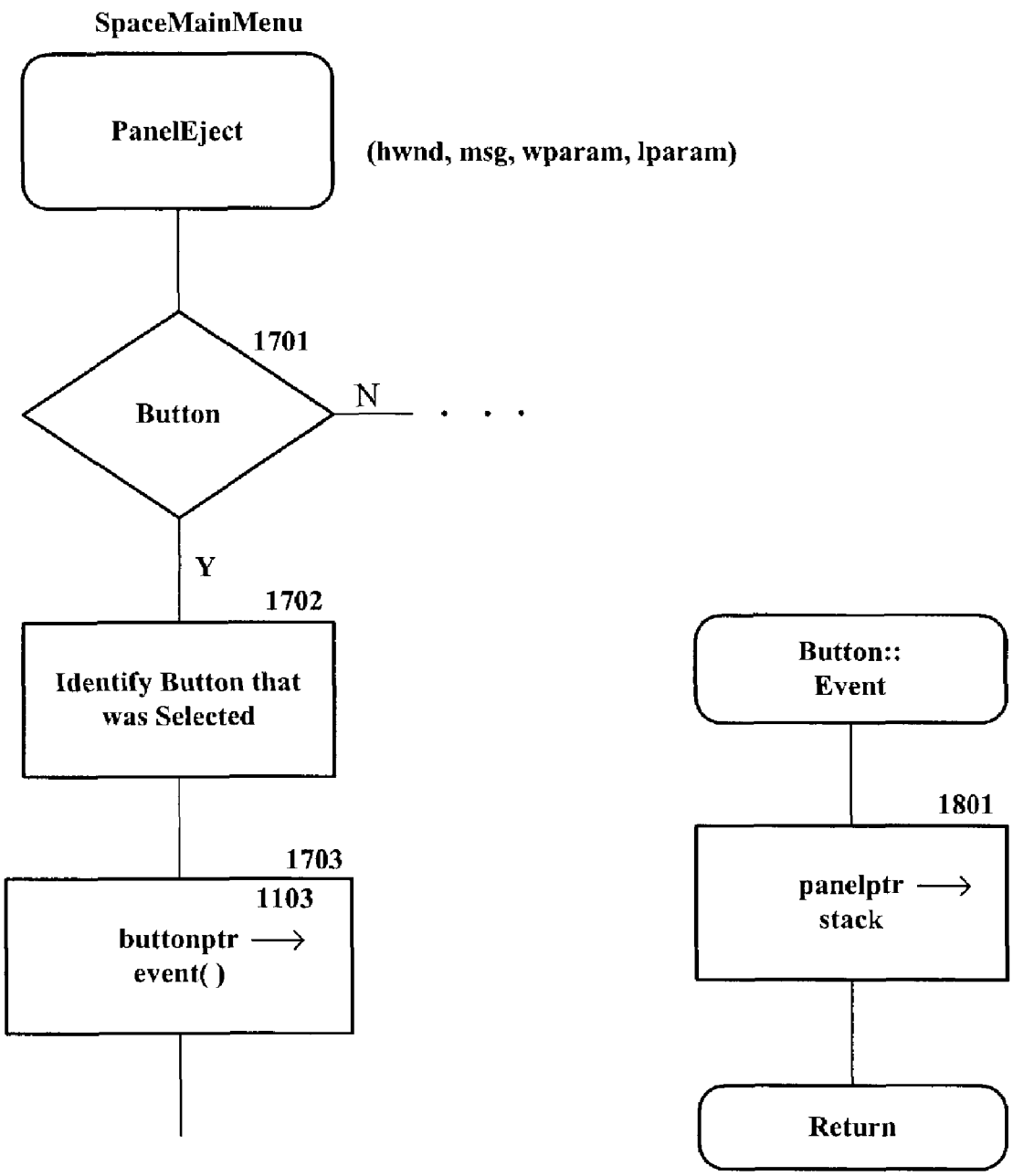
FIG. 17 is a flow diagram illustrating processing when an event is received at the main menu.
FIG. 18 is a flow diagram illustrating processing when a button object receives an event.

FIG. 17 is a flow diagram illustrating processing when an event is received at the main menu. In step 1701, if the event corresponds to the selecting of a button control, then the function continues at step 1702, else the function continues its normal processing. In step 1702, the function identifies the button object corresponding to the button control that was selected. In step 1703, the function passes an indication of that event to the button object.

FIG. 18 is a flow diagram illustrating processing when a button object receives an event. In step 1801, the function stacks (and therefore displays) the panel associated with that button object and then returns.

Figure 19:
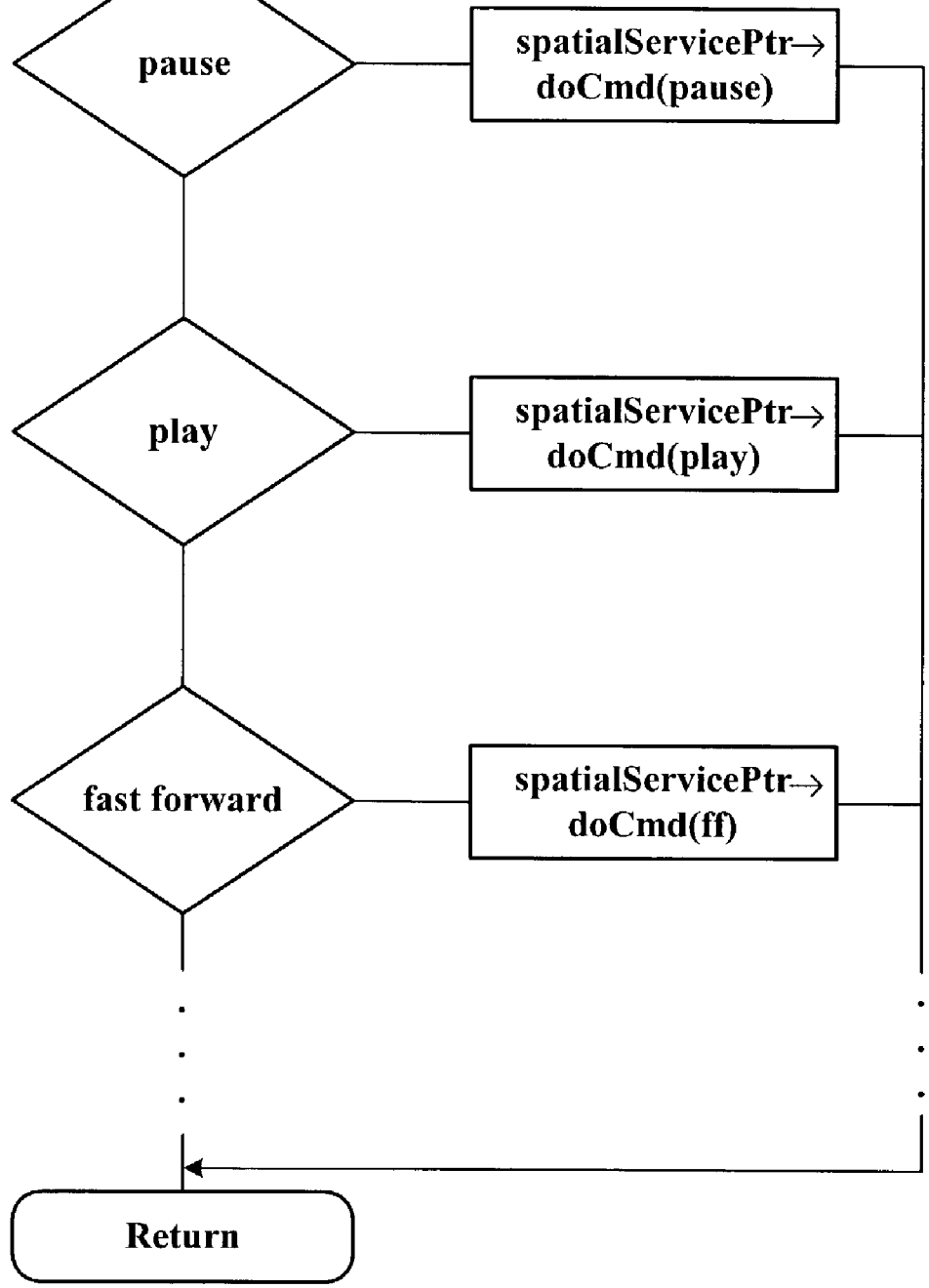
FIG. 19 is a flow diagram illustrating processing when a panel for an ambient audio spatial service receives a user interface event.

FIG. 19 is a flow diagram illustrating processing when a panel for an ambient audio spatial service receives a user interface event. The function decodes the event and sends the appropriate command to the spatial service object.

Although specific embodiments of, and examples of, the present invention are described herein for illustrative purposes, it is not intended that the invention be limited to these embodiments. Equivalent methods, structures, processes, steps, and other modifications within the spirit of the invention are within the scope of the invention. For example, a UCP device includes any devices through which information can be provided to a user and received from the user. A UCP device may be a combination of a display device and keyboard (or mouse), speech synthesizer and voice recognizer, a device that resembles a television remote controller, any other user input/output device, any user input device, or any user output device. Multiple UCP devices can interface with a single spatial component to allow parallel control of the spatial services. Also, the techniques of the present invention can be employed in environments that may or may not be spatially organized. Also, a UCP object may receive events relating to the corresponding space. For example, a lighting system may generate a "lights out" event when all lights within a space are turned off. When the UCP object receives such an event for its space, the UCP can take appropriate action, such as turning off the display light so that the space is entirely dark. A user interface system may be implemented using the techniques and facilities described in U.S. patent application entitled "Method and System for Tracking Software Components." Accordingly, the invention is not limited to these specific embodiments, but instead the scope of the invention is specified by the following claims.

What is claimed is:

1. A method in a computer system for generating a user interface for controlling software components through a user control point device, each software component being identified within a space, the method comprising:
   identifying a space whose software components are to be controlled by the user control point device;
   identifying a user interface component for each software component within the identified space;
   outputting through the user control point device an indication of each software component within the identified space; and
   in response to selection of a software component, passing control to the identified user interface component for that software component.

2. The method of claim 1 wherein the identifying of the user interface component for a software component is based on a type of user control point device.

3. The method of claim 1 wherein software components may contain subcomponent, and including identifying a user interface component for each subcomponent of a software component.

4. The method of claim 3 wherein the identifying of the user interface component for a subcomponent is based on the software component of the subcomponent.

5. The method of claim 1 including:
identifying a user interface component for the identified space wherein the user interface component for the identified space controls the identifying of the user interface component for each software component of the identified space and wherein the user interface component controls the outputting through the user control point device an indication of each software component of the identified space.

6. The method of claim 1 wherein the identifying of a user interface component for the software component includes requesting the software component to indicate a user interface component and receiving an indication of the user interface component from the software component.

7. The method of claim 1 wherein the identifying of a user interface component for the software component includes receiving an indication of the user interface component from the software component.

8. A computer readable medium comprising computer executable instructions for performing the method of claim 1.

9. A computing device comprising means for performing the method of claim 1.

* * * * *

UNITED STATES PATENT AND TRADEMARK OFFICE
CERTIFICATE OF CORRECTION

| | | |
|---|---|---|
| PATENT NO. | : 7,010,749 B2 | Page 1 of 1 |
| APPLICATION NO. | : 10/243169 | |
| DATED | : March 7, 2006 | |
| INVENTOR(S) | : Richard Hasha et al. | |

It is certified that error appears in the above-identified patent and that said Letters Patent is hereby corrected as shown below:

Title Pg, Item (54), in "Title", in column 1, line(s) 1-2, delete "METHOD AND SYSTEM FOR TRACKING SOFTWARE COMPONENTS" and insert -- METHOD AND SYSTEM FOR GENERATING A USER INTERFACE FOR DISTRIBUTED DEVICES --, therefor.

In column 1, line(s) 1-2, delete "METHOD AND SYSTEM FOR TRACKING SOFTWARE COMPONENTS" and insert -- METHOD AND SYSTEM FOR GENERATING A USER INTERFACE FOR DISTRIBUTED DEVICES --, therefor.

Signed and Sealed this

Twenty-eighth Day of July, 2009

JOHN DOLL
*Acting Director of the United States Patent and Trademark Office*